Nov. 27, 1951     W. P. OEHLER     2,576,693
FLEXIBLE CUTOFF FOR PLANTER SEED PLATES
Filed Jan. 31, 1947                    2 SHEETS—SHEET 1

*INVENTOR*
WILLIAM P. OEHLER
BY
*ATTORNEYS*

Nov. 27, 1951  W. P. OEHLER  2,576,693
FLEXIBLE CUTOFF FOR PLANTER SEED PLATES
Filed Jan. 31, 1947  2 SHEETS—SHEET 2

INVENTOR
WILLIAM P. OEHLER
BY
ATTORNEYS

Patented Nov. 27, 1951

2,576,693

UNITED STATES PATENT OFFICE 2,576,693

FLEXIBLE CUTOFF FOR PLANTER SEED PLATES

William P. Oehler, Moline, Ill., assignor to Deere & Company, Moline, Ill., a corporation of Illinois Application January 31, 1947, Serial No. 725,528

11 Claims. (Cl. 222—328)

1

The present invention relates generally to agricultural implements and more particularly to planters and the like, especially the seed dispensing mechanisms thereof.

The object and general nature of the present invention is the provision of planting mechanism especially constructed and arranged to handle shelled peanuts without damage to the seed. Shelled peanuts are easily injured or broken, and further, it is quite generally considered that even if only the skin of a hulled peanut is broken, which not infrequently occurs as the seed passes through the seed dispensing mechanism, the germination of the seed is affected and even if the seed germinates the resulting plant is inferior and not as hardy as plants from unbroken or unabraded seed.

More particularly, it is a feature of this invention to provide seed dispensing mechanism which includes one or more parts made of flexible rubber-like material, thus avoiding sharp metallic edges and other harsh or rough parts so as to eliminate as far as possible any tendency to cut, abrade or break even the skin of the peanut seed. Specifically, it is one feature of the present invention to provide a flat generally horizontally arranged cut-off plate member overlying the seed plate so as to separate the seed in the seed cells from the mass of seed in the hopper in as gentle a manner as possible, and it is a further feature of this invention to provide a baffle plate having a lower edge section formed by a strip of flexible rubber-like material so that during the rotation of the seed plate the seeds in the lower portion of the hopper, which are agitated and stirred by the rotation of the seed plate, are not injured or damaged.

These and other objects and advantages of the present invention will be apparent to those skilled in the art after a consideration of the following detailed description, taken in conjunction with the accompanying drawings, in which.

2

Figure 1:
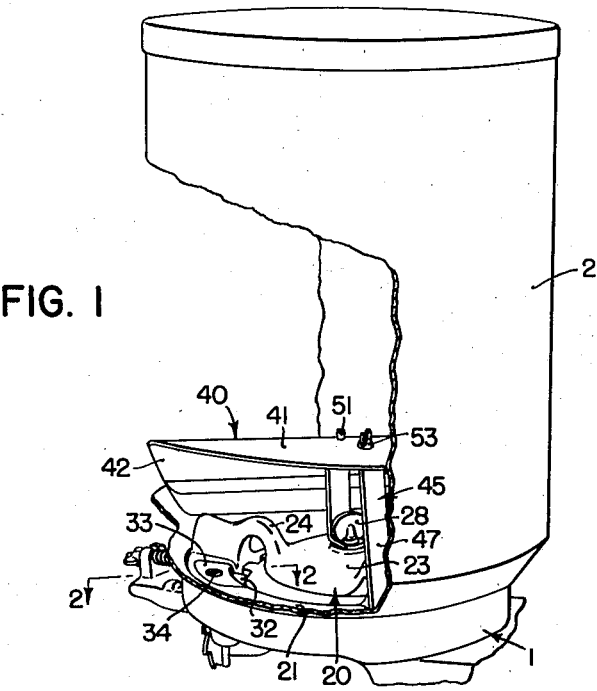
Figure 1 is a sectional view taken through the hopper of a peanut planter.
Figure 2:
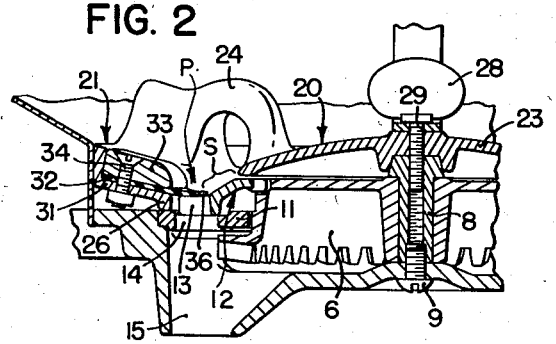
Figure 2 is a detail view of the seed dispensing means, corresponding generally to a section taken along the line 2—2 of Figure 1.
Figure 3:
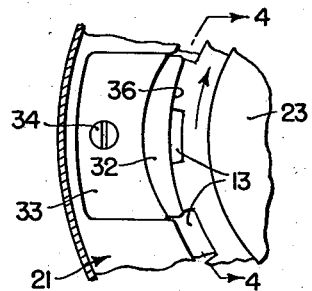
Figure 3 is a fragmentary plan view of the flat flexible cut-off member forming a part of the seed dispensing mechanism.
Figure 4:
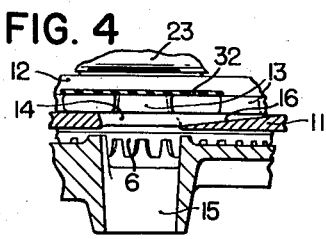
Figure 4 is a sectional view taken along the line 4—4 of Figure 3.
Figure 5:
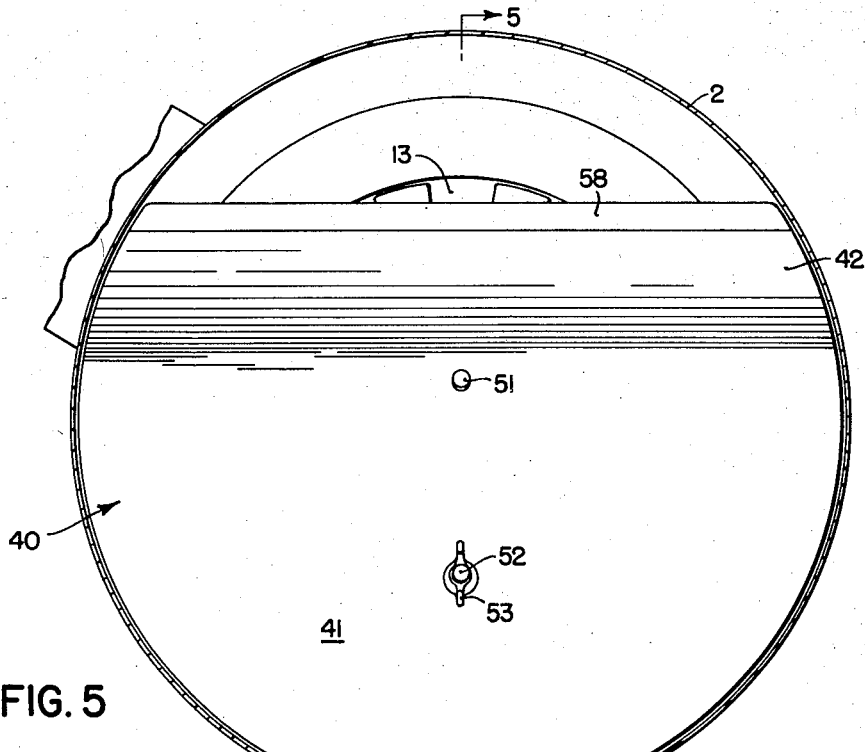
Figure 5 is a plan view of the baffle lying above the seed plate and associated parts.

Referring now more particularly to Figures 1 and 2, the present invention is shown as embodied in a planter hopper construction that includes a base 1 supporting a seed can 2 adapted to contain seed, such as shelled peanuts or the like. The base 1 includes suitable lugs in which a drive shaft having a gear pinion thereon is journaled. The pinion meshes with a gear 6 that is mounted on the base 1 for rotation thereon, preferably by means of a bushing 8 held in place on the base by any suitable means, such as a screw 9, and having an upper threaded end adapted to receive a thumb screw or the like. A false plate 11 is carried by the base 1 and forms a support for a seed plate 12, the latter having cells 13 adapted to receive seed and conduct them to a point of discharge such as an opening 14 in the false plate or support 11. The base carries a spout section 15 disposed underneath the opening 14, and the latter on its approach side is provided with a long or gradual bevel 16 facilitating the movement of the seed from the seed cells 13 into the discharge opening 14.

A cut-off member 20, preferably in the form of a casting having an outer section 21 in the form of a flanged annulus, is connected to a center or attaching section 23 by bridging supports 24. The flange portion of the outer section 21 is indicated by the reference numeral 25 and the radially inner section 26 is generally cylindrical and bears against the false ring or false plate 11. The flanged portion 25 extends outwardly to the side walls of the seed can 2. A thumb screw 28 extends downwardly through an opening 29 in the central section of the cut-off member 20 and serves to fix the latter to the base 1, the thumb screw threading into the upper tapped portion of the bushing 8.

At a portion of the flanged annular section 21 of the cut-off member 20 substantially over the discharge opening 14 is a recessed portion 31 in which a flat substantially horizontal cut-off plate 32 is disposed. Preferably, the cut-off plate 32 is formed of rubber-like material and is held in place by a hold down plate 33 and a bolt 34 which extends downwardly through openings in the cut-off member 32, the hold down plate 33 and the adjacent portions of the cut-off member 20.

Figure 6:
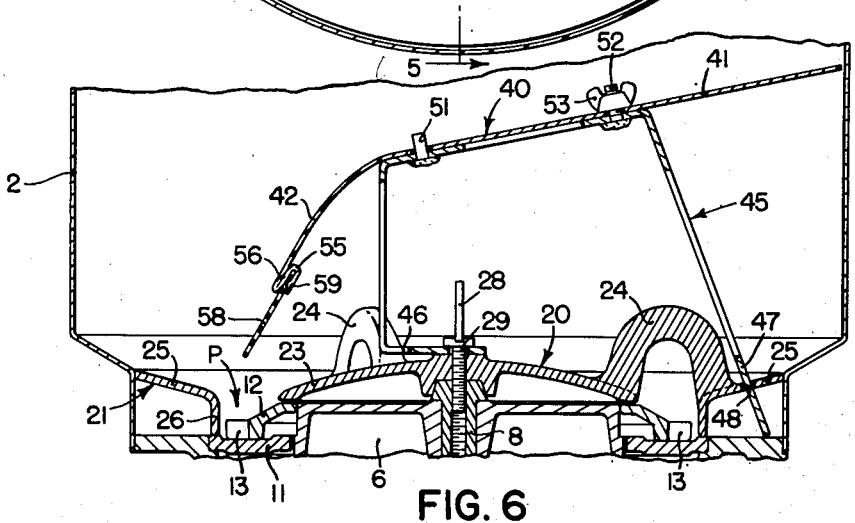
Figure 6 is a view taken along the line 5—5 of Figure 5.

As best shown in Figures 2 and 6 there is an annular seed passageway P lying between the central section 23 and the flanged section 21 of the cut-off member, the latter lying above the seed member 12, the cut-off plate or casting having sloping walls leading toward the passage P so that the seed is caused to be moved gently into the seed cells 13 of the seed plate 12. The cutoff plate 32, which is formed of flexible rubber-like material, lies in the recess 31 in a position substantially against or only slightly above the peripheral celled portion of the seed plate, and preferably the radially innermost edge 36 of the rubber-like cut-off plate 32 terminates short of the adjacent portions of the center section 23 of the cut-off casting 20. If there should be a shelled peanut lying partially in the seed cell that already contains a shelled peanut, the rubber-like cut-off plate gently separates the seed so that only the seed passing under the cut-off member reaches the discharge opening 14. The space S between the edge 36 of the cut-off plate 32 and the adjacent portion of the center section 23 of the cut-off casting is wide enough so that any seed that tends to lie on this portion of the cut-off casting, namely, above the rubber-like cut-off plate 32, will be drawn along by the rotation of the seed plate 12 past the cut-off plate 32, whereby the seed cells 13 of the plate 12 are rapidly filled.

When handling shelled peanuts, it is very desirable not only not to break the seed but also not to break the skin on the seeds for even breaking the skin is considered by many planters as the cause of defective germination. It is therefore desirable to handle the shelled peanuts as gently as possible, and to this end I have provided, not only the rubber-like cut-off plate 32 described above, but also a baffle plate of special construction. The baffle plate in a planter of this type serves the purpose of supporting the main mass of seed in the hopper but in such a way as to keep the weight of the main mass of seed off of the seed lying on the cut-off casting and stirred and moved by rotation of the seed plate so as to cause the seed to enter the seed cells. According to the principles of the present invention the baffle comprises a curved plate 40 having a main section 41 substantially flat and a lower or curved discharge section 42. The baffle 40 is carried on a baffle support 45 having one end 46 adapted to be fastened in place by the thumb screw 28 and a radially outer end 47 adapted to seat in or extend through an opening 48 formed in the flange 25 of the casting member 20. The baffle plate support at its upper portion carries a stud or rivet 51 and spaced therefrom a threaded member 52, preferably welded or otherwise fixed to the support 45, and the baffle plate 40 has a pair of openings to receive the members 51 and 52, there being a thumb nut 53 adapted to be screwed onto the threaded stud 52 for holding the baffle in position on the support 45.

The shelled peanuts from the main mass slide downwardly over the curved section 42 of the baffle plate and into the lower part of the hopper. The rotation of the seed plate stirs and agitates the mass of seed in the lower part of the hopper, usually lying to a depth of an inch or more in the bottom of the hopper. With the usual metal baffle, I have found that the seeds sometimes are damaged by being moved around into contact with the sharp metal edges at the lower end of the baffle. According to the present invention I eliminate the sharp edged metallic lower end of the baffle by applying a flexible rubber or rubber-like strip to the lower portion of the baffle. As best shown in Figure 6, the baffle 40 has a lower edge section 55 bent backwardly onto itself then bent forwardly or downwardly again, forming a channel 56 in which a strip of flexible rubber-like material, indicated at 58, is disposed. The rubber-like strip 58 may be locked in place by one or more indentations 59 formed in the lower wall of the channel 56, firmly gripping the rubber-like strip therebetween. It will thus be seen, particularly from Figure 6, that when the seeds in the lower portion of the can 2 are agitated and stirred by the rotation of the seed plate there is very little likelihood of any damage or injury occurring since contact is had only with the flexible strip 58 which readily yields as the seeds are moved against it.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a planter for planting shelled peanuts and the like without damage to the seed, a base having a seed discharge opening therein, a seed plate rotatably mounted on said base and having a plurality of peripherally disposed seed cells movable over said opening when said seed plate is rotated, and a seed cut-off comprising a relatively soft rubber-like, generally horizontally disposed, approximately rectangular part fixed at its laterally outer side to said base and having its laterally inner side overlapping the celled peripheral portion of said seed plate and lying above said discharge opening, and means fixing said part to said base with the lower face of the radially inner portion of said part substantially in contact with the upper portions of said seed cells whereby seed in said cells may drop by gravity downwardly through said discharge opening and seed above said cut-off plate will be prevented from passing downwardly through said seed cells into said opening.

2. In a planter for planting shelled peanuts and the like without damage to the seed, a base having a discharge opening therein, a seed plate rotatably mounted on said base and having a plurality of peripheral seed cells movable progressively over said opening, and a seed cut-off plate carried by said base and comprising a flat flexible member formed of rubber-like material and disposed in a plane generally parallel to the plane of rotation of said seed plate and fixed at its laterally outer portion to said base, the laterally outer portion of said member lying substantially in said plane and fixed to said base at points substantially in said plane, the laterally inner portion of said member also lying substantially in said plane and disposed snugly against the upper side of said seed plate above said seed discharge opening and overlying at least the major portion of each seed cell, as the latter passes under said cut-off plate.

3. In a planter for planting shelled peanuts and the like without damage to the seed, a base, a seed plate rotatably mounted thereon and having a series of peripherally disposed seed cells, a flange on the radially outer portions of said base, radially outwardly of said seed plate, said base having an opening generally inwardly of said flange and disposed to receive seed discharged from said cells, a substantially horizontally disposed flat cut-off plate, and means fixedly securing the laterally outer portion of said plate to the adjacent portion of the flange on said base with the laterally inner portion of said cut-off plate in a position above said discharge opening and overlying the seed cells of said seed plate, said cut-off plate being flexible vertically at the laterally inner portion overlying said seed cells and the laterally outer portion that is fixed to said flange being substantially coplanar with respect to said laterally inner flexible portion.

4. The invention set forth in claim 3, further characterized by said base flange lying generally above said seed plate and having a recessed portion extending downwardly to approximately the plane of the upper side of said seed plate, and means for detachably mounting said flat cut-off plate in the lower portion of recessed portion.

5. In a planter for planting shelled peanuts and the like without damage to the seed, a base having a discharge opening therein, a seed plate rotatably mounted on said base and having a peripheral series of seed cells movable over said opening, a cut-off member mounted on said base and having an annular seed passage disposed above the peripheral portions of said seed plate for directing seed toward the cells of said plate, and a cut-off plate carried by said cut-off member substantially above said opening and comprising a flat flexible part fixed at its radially outer portion to the adjacent outer portion of said member outwardly of said annular seed passage, said part extending radially inwardly partially across said annular seed passage so as to prevent seed from entering said seed cells as the latter pass over said opening, said cut-off plate terminating short of the opposite side of said annular seed passage whereby seed is moved across said member on the upper side thereof by virtue of contact of certain of said seed with said seed plate between the inner edge of said cut-off plate and the inner adjacent portions of said seed passageway in said cut-off member.

6. In a planter, a cut-off member comprising an inner section and an outer section disposed below the inner section and separated radially therefrom by an annular seed passage, the outer section having a downwardly recessed portion opening radially inwardly into said seed passage a flat cut-off plate formed of resilient material, means fixing the outer part of said plate nonmovably in the downwardly recessed section of said cut-off member, the inner end of said plate extending radially inwardly at least partially toward the inner section thereof across said seed passage.

7. In a planter for planting shelled peanuts and the like without damage to the seed and including a rotatable seed plate, the invention including a cut-off member comprising an inner section and an outer section with an annular seed passage therebetween, the inner section being adapted to overlie said seed plate and the outer section extending below the inner section and adapted to embrace the outer peripheral portions of said rotatable seed plate, the outer section having a recess therein opening radially inwardly into said seed passage adjacent the plane of the upper face of said seed plate, a flat cut-off plate carried by the recessed portion of said outer section and comprising a flat section formed of rubber-like material and having a flat lower surface lying substantially in coplanar relationship with the plane of the upper face of said seed plate, the laterally inner portion of said cut-off plate extending partially across said passageway with the radially inner edge of said cut-off plate spaced from the adjacent portions of the inner section of said cut-off member.

8. In a planter for planting shelled peanuts and the like without damage to the seed, a cut-off member comprising an inner section and an outer section with an annular seed passage therebetween, a flat cut-off plate carried by said outer section and comprising a flat section formed of rubber-like material disposed substantially in the general plane of said cut-off member and extending partially across said passageway with the radially inner edge of said cut-off plate spaced from the adjacent portions of the inner section of said cut-off member, the outer section of said cut-off member having a recessed portion for receiving the radially outer portions of said flat rubber-like cut-off plate, and a hold down plate overlying the outer portions of said cut-off plate for holding the latter in said recess.

9. In a planter for planting shelled peanuts and the like without damage to the seed, a base, a rotatable seed plate having peripheral seed cells mounted on said base, a cut-off member carried stationarily by said base, a flat cut-off plate carried by said cut-off member in a position horizontally above the peirpheral portion of said seed plate at one side thereof, a baffle plate support carried by said cut-off member, and a baffle plate mounted on said baffle plate support and having a generally downwardly extending edge disposed generally above and spaced generally vertically from said cut-off member, the lower edge of said baffle plate having a flexible strip formed of rubber-like material fixed thereto and also lying above said cut-off member, whereby peanuts or other seed moving thereagainst will not be damaged.

10. In a planter for planting shelled peanuts and the like without damage to the seed and in which said planter includes a base having a discharge opening therein and a seed plate rotatably mounted on said base and having a peripheral series of seed cells movable over said opening, the improvement comprising a cut-off member adapted to be mounted on said base and having an annular seed passage adapted to be disposed above the peripheral portion of said seed plate for directing seed toward the cells of said plate, and a cut-off plate carried by said cut-off member in a position to lie substantially above said discharge opening in the base, said cut-off plate comprising a relatively flat flexible part fixed at its radially outer portion to the adjacent outer portion of said cut-off member outwardly of said annular seed passage, said part extending radially inwardly partially across said annular seed passage so as to prevent seed from entering said seed cells as the latter pass over said discharge opening, said cut-off plate terminating short of the opposite side of said annular seed passage whereby seed is moved across said member on the upper side thereof by virtue of contact of certain of said seeds with said seed plate between the inner edge of said cut-off plate and the inner adjacent portions of said seed passageway in said cut-off member.

11. In a planter for planting shelled peanuts and the like without damage to the seed, a cut-off member comprising an inner section and an outer section with an annular seed passage therebetween, a flat cut-off plate carried by said outer section and comprising a flat section formed of rubber-like material disposed substantially in the general plane of said cut-off member and extending partially across said passageway with the radially inner edge of said cut-off plate spaced from the adjacent portions of the inner section of said cut-off member, the outer section of said cut-off member having a recessed portion for receiving the radially outer portion of said flat rubber-like cut-off plate, and means acting between said cut-off plate and the outer section of said cut-off member for holding said cut-off plate in said recess.

WILLIAM P. OEHLER.

REFERENCES CITED

The following references are of record in the file of this patent:

UNITED STATES PATENTS

| Number | Name | Date |
| --- | --- | --- |
| 151,490 | Howland | June 2, 1874 |
| 488,650 | Dodd | Dec. 27, 1892 |
| 538,915 | Hopgood | May 7, 1895 |
| 552,434 | Harman et al. | Dec. 31, 1895 |
| 699,200 | Loring | May 6, 1902 |
| 764,544 | Anderson et al. | July 12, 1904 |
| 958,483 | Dykstra | May 17, 1910 |
| 1,051,075 | Breen | Jan. 21, 1918 |
| 1,265,323 | Graham | May 7, 1918 |
| 1,275,333 | Waterman | Aug. 13, 1918 |